(12) United States Patent
Johri et al.

(10) Patent No.: US 10,214,203 B2
(45) Date of Patent: Feb. 26, 2019

(54) SYSTEM AND METHOD FOR DETERMINING ENGINE PULL-UP THRESHOLD

(71) Applicant: FORD GLOBAL TECHNOLOGIES, LLC, Dearborn, MI (US)

(72) Inventors: Rajit Johri, Canton, MI (US); Jason Meyer, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 15/201,731

(22) Filed: Jul. 5, 2016

(65) Prior Publication Data

US 2018/0009433 A1    Jan. 11, 2018

(51) Int. Cl.

| | |
|---|---|
| *B60W 10/26* | (2006.01) |
| *B60W 10/06* | (2006.01) |
| *B60W 20/40* | (2016.01) |
| *B60K 6/387* | (2007.10) |
| *B60K 6/46* | (2007.10) |
| *F02D 41/02* | (2006.01) |
| *F02D 41/06* | (2006.01) |
| *B60K 6/48* | (2007.10) |

(Continued)

(52) U.S. Cl.
CPC .............. *B60W 20/40* (2013.01); *B60K 6/387* (2013.01); *B60K 6/46* (2013.01); *B60K 6/48* (2013.01); *B60W 10/02* (2013.01); *B60W 10/026* (2013.01); *B60W 10/06* (2013.01); *B60W 10/08* (2013.01); *F02D 41/022* (2013.01); *F02D 41/065* (2013.01); *F02N 11/0833* (2013.01); *B60K 2006/4825* (2013.01); *B60W 2510/0233* (2013.01); *B60W 2510/0241* (2013.01); *B60W 2510/081* (2013.01); *B60W 2510/082* (2013.01); *B60W 2510/083* (2013.01); *B60W 2510/088* (2013.01); *B60W 2520/10* (2013.01); *B60W 2540/10* (2013.01); *B60W 2710/025* (2013.01); *B60W 2710/027* (2013.01); *B60Y 2200/92* (2013.01); *B60Y 2300/182* (2013.01); *B60Y 2300/192* (2013.01); *F02N 2200/042* (2013.01); *F02N 2200/0802* (2013.01); *Y10S 903/903* (2013.01); *Y10S 903/914* (2013.01)

(58) Field of Classification Search
CPC .............. B60W 10/026; B60W 10/06; B60W 2510/0233

See application file for complete search history.

(56) References Cited

U.S. PATENT DOCUMENTS

| | | | | |
|---|---|---|---|---|
| 8,758,200 B2 * | 6/2014 | Dai | ...................... | B60W 10/08 477/176 |
| 2007/0261901 A1 * | 11/2007 | Janson | .................. | B60K 6/365 180/65.31 |

(Continued)

*Primary Examiner* — Tisha D Lewis
(74) *Attorney, Agent, or Firm* — Brooks Kushman P.C.

(57) ABSTRACT

A system and method for modifying the engine pull-up (EPU) logic within a hybrid vehicle based on max motor torque that accounts for the drop or change in available motor torque due to the opening/slipping of a torque converter bypass clutch during engine starts is disclosed. An engine pull-up threshold is determined from max available motor torque at a virtual impeller speed, where the virtual impeller speed is the impeller speed that would result if the torque converter bypass clutch was open/slipping and transferring the same amount of torque.

12 Claims, 4 Drawing Sheets

(51) Int. Cl.
*B60W 10/02* (2006.01)
*B60W 10/08* (2006.01)
*F02N 11/08* (2006.01)

(56) References Cited

U.S. PATENT DOCUMENTS

| | | | |
|---|---|---|---|
| 2008/0275624 A1* | 11/2008 | Snyder | B60W 20/15 |
| | | | 701/104 |
| 2011/0054765 A1* | 3/2011 | Lewis | F02D 41/062 |
| | | | 701/112 |
| 2011/0100157 A1* | 5/2011 | Roses | F16D 25/082 |
| | | | 74/606 R |
| 2013/0264164 A1* | 10/2013 | Otanez | F16H 61/0031 |
| | | | 192/3.3 |
| 2013/0291830 A1 | 11/2013 | Doering et al. | |
| 2013/0296132 A1* | 11/2013 | Doering | B60K 6/48 |
| | | | 477/86 |
| 2015/0065297 A1* | 3/2015 | Hoshiba | B60W 20/10 |
| | | | 477/19 |
| 2015/0246670 A1 | 9/2015 | Ideshio et al. | |

* cited by examiner

SYSTEM AND METHOD FOR DETERMINING ENGINE PULL-UP THRESHOLD

TECHNICAL FIELD

This disclosure relates to hybrid vehicle powertrain control systems. More specifically, this disclosure relates to engine pull-up controls.

BACKGROUND

Hybrid vehicles include an engine and an electric machine that operates as a motor/generator with an associated battery to provide an electric vehicle (EV) mode using only electric power to propel the vehicle, or a hybrid electric vehicle (HEV) mode that uses the engine and electric machine to propel the vehicle. Some hybrid vehicle powertrain configurations include a disconnect clutch configured to selectively disengage the engine from the electric machine and transmission while operating in EV mode.

While operating in EV mode, hybrid vehicles may start the engine (engine pull up) using a starter motor. Alternatively, the engine may be started by engaging (or closing) the disconnect clutch and using the electric machine to start the engine. During disconnect clutch engagement, a torque converter bypass clutch may be opened to isolate the driveline from torque disturbance. Opening and/or slipping the torque converter bypass clutch acts like a low pass filter and dampens the torque disturbances from propagating through the driveline.

Engine pull-up requests depend on multiple considerations such as accelerator tip in/out, total driver power demand and maximum available motor torque. Many engine pull-up strategies only account for maximum available motor torque at present or current impeller speed and do not account for the change in maximum available motor torque due to increase in motor speed as a result of opening the torque converter bypass clutch during engine starts. If the engine start/engine pull-up threshold does not account for this dynamic change in available motor torque, opening/slipping of torque converter bypass clutch during engine starts may result in a torque hole.

SUMMARY

According to embodiments of the present disclosure, a control algorithm for modifying the engine pull-up (EPU) logic within a hybrid vehicle based on maximum motor torque is disclosed. In particular, the control algorithm accounts for the drop or change in maximum available motor torque due to the opening/slipping of the torque converter bypass clutch during engine starts.

In one embodiment, a vehicle is disclosed having a powertrain that includes an engine, a torque converter having a bypass clutch, and a motor configured to be selectively coupled to the engine. The vehicle may include a controller programmed to restart the engine in response to the bypass clutch of the torque converter being locked and a motor torque exceeding an engine pull-up threshold. The engine pull-up threshold may be based on a maximum available motor torque determined from a virtual impeller speed of the torque converter. The virtual impeller speed may also be determined from a turbine speed and a desired slip across the bypass clutch of the torque converter during an engine start. The desired slip across the bypass clutch of the torque converter may be determined from a driver torque demand and a vehicle speed. The engine pull-up threshold may further be based on the maximum available motor torque less a change in hydraulic torque required to keep a turbine torque of the torque converter constant during an engine start.

In another embodiment, an engine pull-up system for a vehicle having an engine selectively coupled to a motor is disclosed. The engine pull-up system may include a controller programmed to restart the engine in response to a bypass clutch of a torque converter being locked and a motor torque exceeding an engine pull-up threshold. The engine pull-up threshold may be based on a maximum available motor torque determined from a virtual impeller speed of the torque converter, and the virtual impeller speed may be determined from a speed that would have resulted if the bypass clutch of the torque converter was fully open for a turbine speed and a turbine torque. The engine pull-up threshold may further be determined from a virtual hydraulic torque associated with a torque that would result if the bypass clutch of the torque converter was fully open for the turbine speed and the turbine torque. The controller may further be programmed to restart the engine in response to the bypass clutch of the torque converter being open and the motor torque exceeding a corresponding threshold based on the maximum available motor torque determined from a motor speed.

In yet another embodiment, a method for control of a vehicle having a motor selectively coupled to an engine is disclosed. The method may include controlling engine pull up in response to a bypass clutch of the torque converter being locked and a motor torque exceeding an engine pull-up threshold associated with a maximum available motor torque determined from a virtual impeller speed of the torque converter. The method may also include maintaining operation of the vehicle with the engine off in response to the motor torque being below the engine pull-up threshold. The engine pull-up threshold may further be based on the maximum available motor torque less a change in hydraulic torque required to keep a turbine torque of the torque converter constant during an engine start. The change in hydraulic torque may be determined from a virtual torque ratio across the torque converter.

Various embodiments may provide one or more advantages. For example, engine pull-up control in a hybrid vehicle according to various embodiments provides robust and efficient engine starts based on an engine pull-up threshold determined from maximum available torque at a virtual impeller speed that accounts for the change in maximum available motor torque as the impeller speed changes with the opening/slipping of the torque converter bypass clutch. One or more embodiments provide a dynamically calculated torque for filling the torque hole created by loosening of the torque converter to provide driveline isolation to engine start disturbance, which may improve overall vehicle performance and efficiency.

The above advantages and other advantages and features of various embodiments of the claimed subject matter may be recognized by those of ordinary skill in the art based on the representative embodiments described and illustrated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
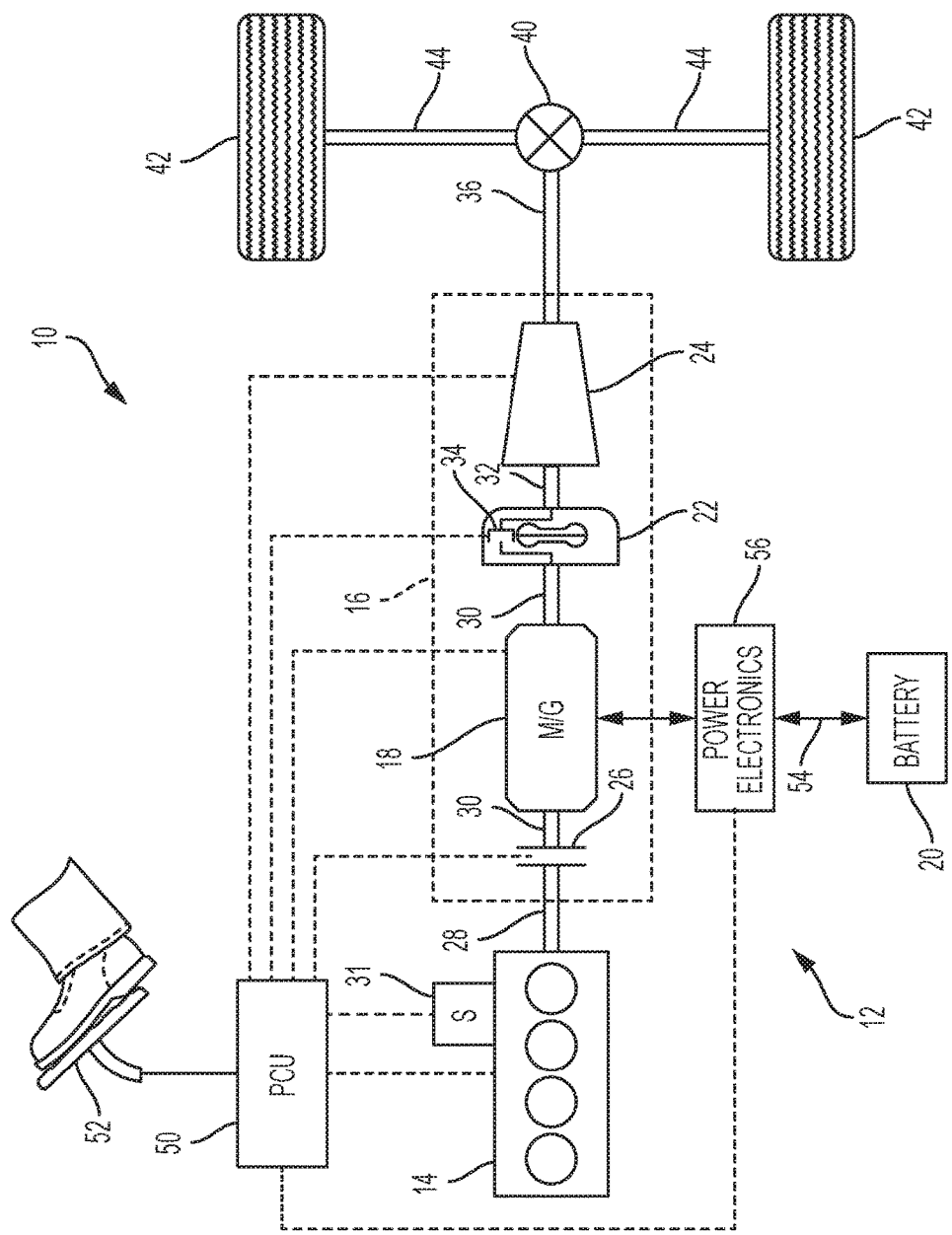
FIG. 1 is a schematic illustration of a hybrid vehicle according to one or more embodiments of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 24 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as engine pull-up requests, starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (APPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

As described above, the engine may be started using the motor by engaging the disconnect clutch. During disconnect clutch engagement, the motor needs to compensate for torque being transmitted through the clutch. To further isolate the driveline from torque disturbance during engagement, the torque converter bypass clutch may be opened. Opening/slipping a torque converter bypass clutch acts like a low pass filter and dampens the torque disturbance from propagating through the driveline.

However, a torque hole may be created as a direct result of the opening or slipping of the torque converter bypass clutch during engine starts. The torque hole may be proportional to the reduction in the mechanical path torque (i.e., torque converter bypass clutch capacity). Torque transferred through the torque converter is a combination of the hydraulic and mechanical (torque converter bypass clutch capacity) paths. The torque converter also creates reaction torque on the impeller.

$$\tau_{impeller} = \tau_{Hydraulic} + \tau_{Mechanical} \tag{1}$$

As shown in Equation (1), $\tau_{impeller}$ is the reaction torque on the impeller, $\tau_{Mechanical}$ is the mechanical component of torque transmitted through the torque converter bypass clutch and $\tau_{Hydraulic}$ is the hydraulic component of torque transmitted by the torque converter that is a function of slip across the torque converter and the impeller speed. When the torque converter bypass clutch is open, the transmitted torque is purely through the hydraulic path. When the torque converter bypass clutch is locked, the hydraulic path is bypassed and all the torque is transmitted through the bypass clutch.

For a given torque converter, turbine torque $\tau_{turbine}$ and hydraulic torque $\tau_{Hydraulic}$ are calculated using the capacity factor and torque ratio curves.

$$\tau_{Hydraulic} = \left(\frac{\omega_{impeller}}{K(SR)}\right)^2 \tag{2}$$

$$\tau_{turbine} = \tau_{Hydraulic} * T_R(SR) + \tau_{Mechanical} \tag{3}$$

$$SR = \frac{\omega_{impeller}}{\omega_{turbine}} \tag{4}$$

As shown in Equations (2), (3) and (4), K is the capacity factor curve, $T_R$ is the torque ratio curve and both are a function of the speed ratio, SR. Additionally, $\tau_{Hydraulic}$ and $\tau_{turbine}$ are the hydraulic and turbine torque, respectively.

With a reduction in torque converter bypass clutch capacity, the motor torque will go towards accelerating the impeller to a higher value thereby creating positive slip and transferring additional torque through the hydraulic path. And as the motor accelerates to a new impeller speed, the motor torque available will decrease with the increase in impeller speed if the new resulting impeller speed is past the electric motor knee point. This will reduce available torque for vehicle propulsion.

Figure 2:
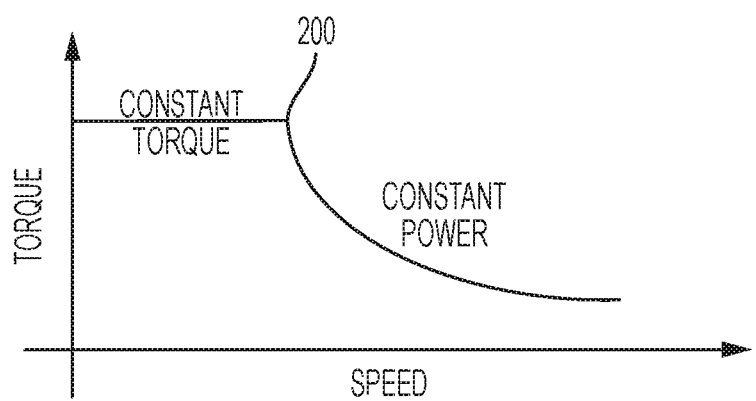
FIG. 2 is a graphical illustration of motor torque limits as a function of motor/impeller speed according to one or more embodiments of the present disclosure.

Referring to FIG. 2, a graph illustrating the relationship between available motor torque and motor speed is shown. As shown in FIG. 2, past knee point 200, the motor is power limited and maximum motor torque reduces as a motor speed increases. And if the engine start threshold does not account for this dynamic change in available motor torque, the opening/slipping of the torque converter bypass clutch during engine starts will result in a torque hole.

Figure 3:
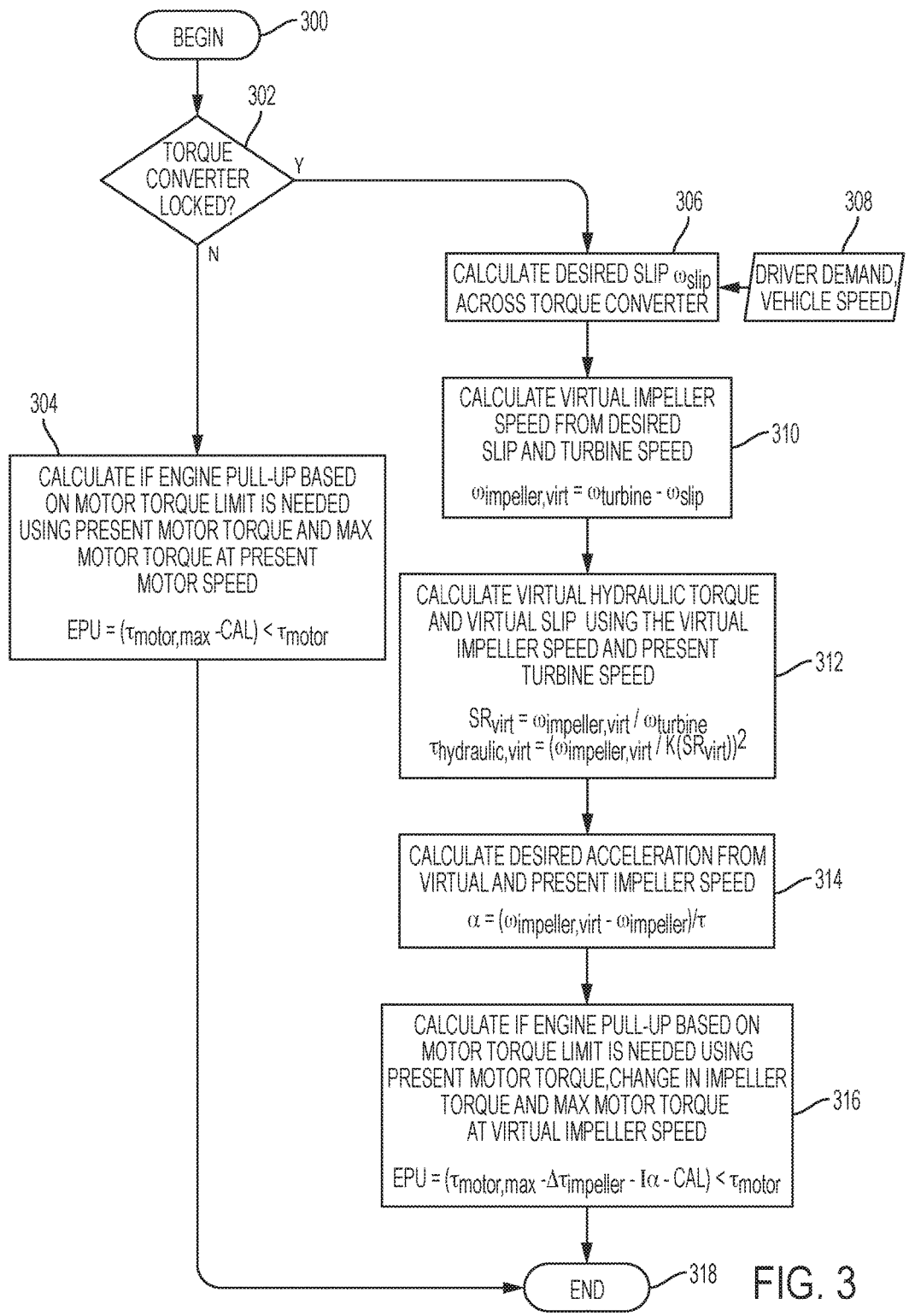
FIG. 3 is a flow chart illustrating a method for engine pull-up control when the torque converter bypass clutch is commanded to slip during an engine start according to various embodiments of the present disclosure.
Figure 4:
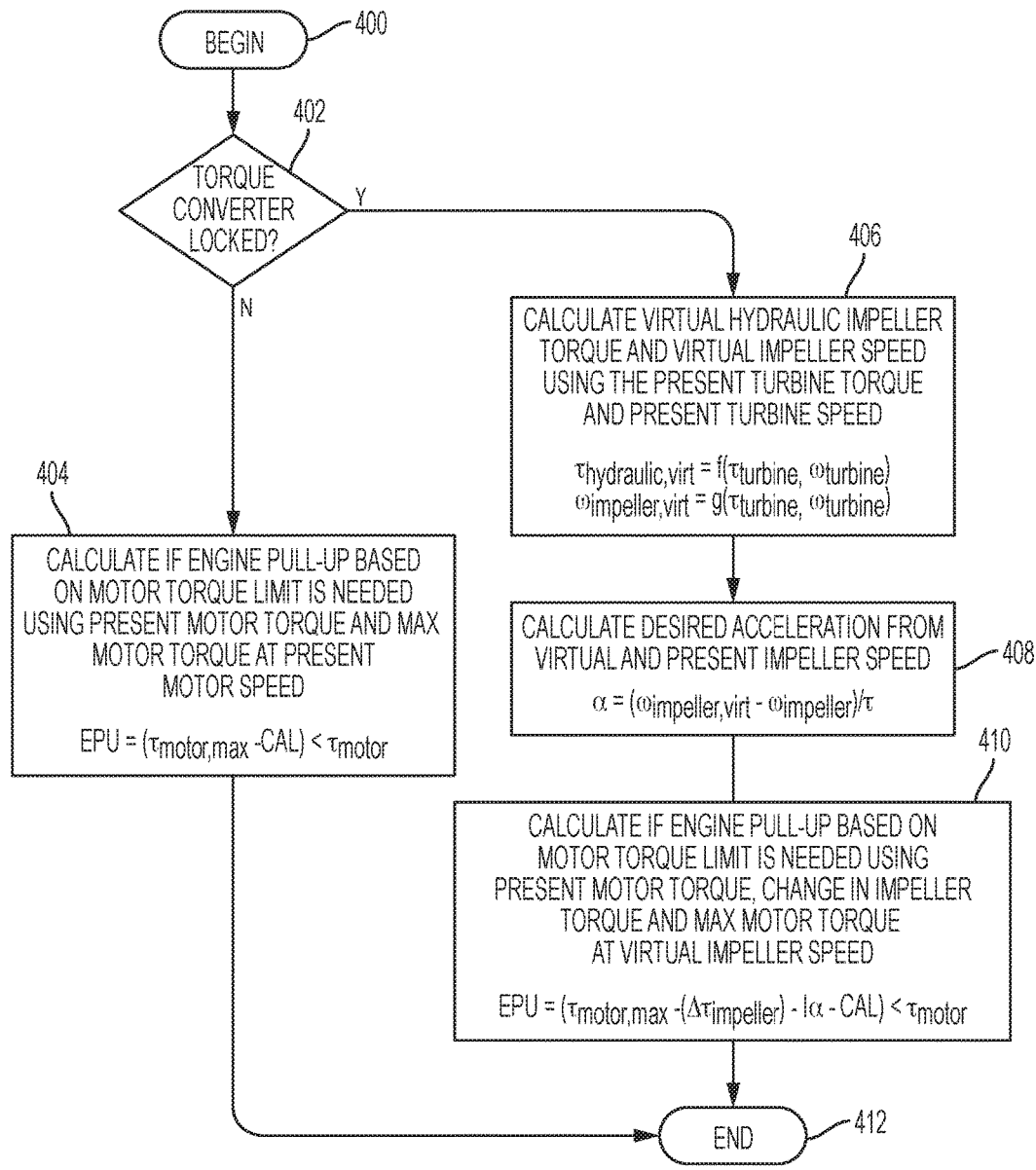
FIG. 4 is a flow chart illustrating a method for engine pull-up control when the torque converter bypass clutch is commanded to fully open during an engine start according to various embodiments of the present disclosure.

FIGS. 3 and 4 describe control algorithms for modifying the engine pull-up (EPU) logic within the vehicle controller(s) based on this drop or change in available motor torque due to the opening/slipping of the torque converter bypass clutch during engine starts. More specifically, methods are provided for calculating a virtual impeller speed that is the impeller speed if the torque converter bypass clutch was open or slipping at a predetermined value. The maximum available motor torque for EPU is then calculated at this virtual impeller speed instead of present motor speed.

This accounts for the change in available maximum motor torque when the torque converter bypass clutch actually opens/slips during engine starts. Control algorithms are also provided for dynamically calculating additional torque required to be delivered via the hydraulic path of the torque converter due to loosening of the torque converter.

As those of ordinary skill in the art will understand, the functions represented in FIGS. 3 and 4 may be performed by software and/or hardware depending on the particular application and implementation. The various functions may be performed in an order or sequence other than illustrated in FIGS. 3 and 4 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated.

With reference to FIG. 3, a flow chart illustrating a method for EPU control when the torque converter bypass clutch is commanded to slip during an engine start is shown. The method begins at decision block 300 and the control algorithm determines if the torque converter bypass clutch is locked at 302. If the torque converter bypass clutch is already open at block 302, EPU is determined at 304 based on motor torque limits using present motor torque and the maximum motor torque at present motor speed. The routine will end at block 318. Specifically, when the torque converter bypass clutch is already open, EPU may be determined using Equation (5).

$$\text{EPU} = (\tau_{motor,max} - \text{CAL}) < \tau_{motor} \tag{5}$$

As shown in Equation (5), EPU is a flag and TRUE when the vehicle controller calculates that the engine should be started based on motor torque limits where $\tau_{motor,max}$ is the max available motor torque at the present motor speed, CAL is a calibratable threshold and $\tau_{motor}$ is the actual motor torque at the given instant.

If the torque converter bypass clutch is locked at block 302, the control algorithm calculates the desired slip $\omega_{slip}$ across the torque converter bypass clutch at block 306. During engine start, the torque converter bypass clutch may be commanded to a predetermined slip to isolate the disturbance from engine starts. The predetermined or desired slip $\omega_{slip}$ may be a function of present driver demand, present vehicle speed and/or other variables, as shown at input block 308. Based on the desired slip $\omega_{slip}$, a virtual impeller speed $\omega_{impeller,virt}$ can be calculated at block 310 using present turbine speed $\omega_{turbine}$ (or impeller speed $\omega_{impeller}$) and desired slip $\omega_{slip}$. Turbine and impeller speed are the same when the torque converter bypass clutch is locked. Specifically, the virtual impeller speed $\omega_{impeller,virt}$ can be calculated using Equation (6).

$$\omega_{impeller,virt} = \omega_{turbine} + \omega_{slip} \tag{6}$$

Based on this virtual impeller speed $\omega_{impeller,virt}$, the control algorithm calculates the hydraulic torque $\tau_{hydraulic,virt}$ that will be produced by spinning the impeller faster than the turbine at block 312 using the virtual impeller speed $\omega_{impeller,virt}$ and present turbine speed $\omega_{turbine}$.

$$SR_{virt} = \frac{\omega_{impeller,virt}}{\omega_{turbine}} \tag{7}$$

$$\tau_{hydraulic,virt} = \left(\frac{\omega_{impeller,virt}}{K(SR_{virt})}\right)^2 \tag{8}$$

As shown in Equations (7) and (8), $SR_{virt}$ is the ratio of the virtual impeller speed $\omega_{impeller,virt}$ to the present or current turbine speed $\omega_{turbine}$ and $\tau_{hydraulic,virt}$ is the hydraulic torque. The desired acceleration is then calculated at block 314 from the virtual impeller speed $\omega_{impeller,virt}$ and the present impeller speed $\omega_{impeller}$.

$$\alpha = \frac{(\omega_{impeller,virt} - \omega_{impeller})}{t} \tag{9}$$

As shown in Equation (9), $\alpha$ is the change in desired motor acceleration over time, t. The amount of impeller torque required to produce the same turbine torque before and after slipping the torque converter bypass clutch changes. The change in impeller torque $\Delta\tau_{impeller}$ can be calculated with Equations (10)-(13), as shown below.

$$\tau_{turbine} = \tau_{hydraulic,virt} * T_R(SR_{virt}) + \tau_{Mechanical,virt} \tag{10}$$

$$\tau_{impeller,virt} = \tau_{hydraulic,virt} + \tau_{Mechanical,virt} \tag{11}$$

$$\Delta\tau_{impeller} = \tau_{impeller,virt} - \tau_{turbine} \tag{12}$$

$$\Delta\tau_{impeller} = \tau_{hydraulic,virt} * (1 - T_R(SR_{virt})) \tag{13}$$

The control algorithm then calculates at block 316 whether EPU based on motor torque limits is needed using present motor torque, change in impeller torque and max motor torque at the virtual impeller speed.

$$\text{EPU} = (\tau_{motor,max} - \Delta\tau_{impeller} - I\alpha - \text{CAL}) < \tau_{motor} \tag{14}$$

As shown in Equation (14), EPU is a flag and TRUE when the vehicle controller calculates that the engine should be started based on motor torque limits. Here, $\tau_{motor,max}$ is the max available motor torque calculated at virtual impeller speed $\omega_{impeller,virt}$, $\Delta\tau_{impeller}$ is the change in impeller torque that is required to keep turbine torque constant, I is the motor and impeller inertia, $\alpha$ is the change in desired motor acceleration, CAL is a calibratable threshold and $\tau_{motor}$ is the actual motor torque at the given instant. The routine ends at block 318.

Referring to FIG. 4, a flow chart illustrating another method for EPU control when the torque converter bypass clutch is commanded to fully open during an engine start is shown. The method begins at decision block 400 and the control algorithm determines if the torque converter bypass clutch is locked at 402. If the torque converter bypass clutch is already open at block 402, then the algorithm proceeds to block 404 where EPU is determined based on motor torque limits using present motor torque $\tau_{motor}$ and the maximum motor torque $\tau_{motor,max}$ at present motor speed. The routine will then end at 412. Specifically, when the torque converter bypass clutch is already open, EPU may be determined using Equation (5) described above.

If the torque converter bypass clutch is locked at block 402, the control algorithm then proceeds to block 406 where the virtual hydraulic impeller torque $\tau_{hydraulic,virt}$ and virtual impeller speed $\omega_{impeller,virt}$ are calculated using the present turbine torque $\tau_{turbine}$ and present turbine speed $\omega_{turbine}$. Torque converter model Equations (1)-(4) described above can be numerically inverted to reverse the causality of the torque converter model and predict impeller speed and hydraulic impeller torque for a given turbine speed and turbine torque.

$$\tau_{hydraulic,virt} = f(\tau_{turbine}, \omega_{turbine}) \tag{15}$$

$$\omega_{impeller,virt} = g(\tau_{turbine}, \omega_{turbine}) \tag{16}$$

As shown in Equations (15) and (16), f and g are transfer functions obtained by inverting Equations (1)-(4). At any given instant, for a given turbine torque and turbine speed, virtual hydraulic impeller torque $\tau_{hydraulic,virt}$ and virtual impeller speed $\omega_{impeller,virt}$ can be calculated using Equations (15) and (16). A virtual impeller speed $\omega_{impeller,virt}$ can be calculated using present turbine speed $\omega_{turbine}$ (or impeller speed $\omega_{impeller}$) that will result in hydraulic torque through the torque converter that keeps the turbine torque constant between locked and open torque converter states. The virtual impeller speed $\omega_{impeller,virt}$ and virtual hydraulic impeller torque $\tau_{hydraulic,virt}$ are the speed and torque that would have resulted if the torque converter bypass clutch was fully open for present turbine speed $\omega_{turbine}$ and present turbine torque $\tau_{turbine}$.

At block 408, the control algorithm calculates the desired acceleration, α, from the virtual impeller speed $\omega_{impeller,virt}$ and present impeller speed $\omega_{impeller}$ using Equation (9) described above. Equations (10)-(13) can then be used to determine the change in impeller torque $\Delta\tau_{impeller}$ required to keep the turbine torque constant. Then at block 410, it is determined whether EPU based on motor torque limits is needed using present motor torque, change in impeller torque required to keep the turbine torque constant and max motor torque at the virtual impeller speed.

$$EPU=[\tau_{motor,max}-\Delta\tau_{impeller}-I\alpha-CAL]<\tau_{motor} \quad (17)$$

As shown in Equation (17), EPU is a flag and TRUE when the vehicle controller calculates that the engine should be started based on motor torque limits. Here, $\tau_{motor,max}$ is the max available motor torque at virtual impeller speed $\omega_{impeller,virt}$, $\Delta\tau_{impeller}$ is the change in impeller torque, I is the motor and impeller inertia, α is the change in desired motor acceleration, CAL is a calibratable threshold and $\tau_{motor}$ is the actual motor torque at the given instant. The algorithm ends at block 412.

As can be seen by the representative embodiments described herein, embodiments according to the present disclosure provide robust and efficient engine starts based on an engine pull-up threshold that accounts for the change in max available motor torque as the impeller speed changes with the opening/slipping of the torque converter bypass clutch. One or more embodiments provide a dynamically calculated torque for filling the torque hole created by loosening of the torque converter to provide driveline isolation to engine start disturbance, which may improve overall vehicle performance and efficiency.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. An engine pull up system for a vehicle having an engine selectively coupled to a motor, comprising:
   a controller programmed to restart the engine in response to a bypass clutch of a torque converter being locked and a motor torque exceeding an engine pull up threshold based on a maximum available motor torque determined from a virtual impeller speed of the torque converter, wherein the virtual impeller speed is determined from a speed that would have resulted if the bypass clutch of the torque converter was fully open for a turbine speed and a turbine torque.

2. The engine pull up system of claim 1, wherein the engine pull up threshold is further determined from a virtual hydraulic torque associated with a torque that would result if the bypass clutch of the torque converter was fully open for the turbine speed and the turbine torque.

3. The engine pull up system of claim 1, wherein the controller is further programmed to restart the engine in response to the bypass clutch of the torque converter being open and the motor torque exceeding a corresponding threshold based on the maximum available motor torque determined from a motor speed.

4. The engine pull up system of claim 1, wherein the virtual impeller speed is further based on a turbine speed associated with a hydraulic torque value required to keep a turbine torque of the torque converter constant between a torque converter locked state and a torque converter open state.

5. A method for vehicle control comprising:
   controlling engine pull up in response to a bypass clutch of a torque converter being locked and a motor torque exceeding an engine pull up threshold associated with a maximum available motor torque determined from a virtual impeller speed of the torque converter determined from a speed that would result if the bypass clutch of the torque converter was fully open for a turbine speed and a turbine torque.

6. A method for controlling an engine of a vehicle, comprising:
   controlling engine pull up responsive to a bypass clutch of a torque converter being locked and a motor torque exceeding an engine pull up threshold associated with a maximum available motor torque determined from a virtual impeller speed of the torque converter; and
   maintaining operation of the vehicle with the engine off in response to the motor torque being below the engine pull up threshold.

7. The method of claim 5, wherein the engine pull up threshold is further based on the maximum available motor torque less a change in hydraulic torque required to keep a turbine torque of the torque converter constant during an engine start, and wherein the change in hydraulic torque is determined from a virtual torque ratio across the torque converter.

8. The method of claim 7, wherein the engine pull up threshold is further based on an inertia associated with a motor and a desired acceleration of the motor determined from the virtual impeller speed and an actual impeller speed of the torque converter.

9. The method of claim 6, wherein the virtual impeller speed is determined from a turbine speed and a desired slip across the bypass clutch of the torque converter during an engine start, the desired slip across the bypass clutch of the torque converter being based on a driver torque demand and a vehicle speed.

10. The method of claim 6, wherein the virtual impeller speed is determined from a speed that would result if the bypass clutch of the torque converter was fully open for a turbine speed and a turbine torque.

11. The method of claim 6, wherein the engine pull up threshold is further based on the maximum available motor torque less a change in hydraulic torque required to keep a turbine torque of the torque converter constant during an engine start, and wherein the change in hydraulic torque is determined from a virtual torque ratio across the torque converter.

12. The method of claim 6, wherein the engine pull up threshold is further based on an inertia associated with a motor and a desired acceleration of the motor determined from the virtual impeller speed and an actual impeller speed of the torque converter.

* * * * *